United States Patent [19]

Merianos et al.

[11] 3,895,932

[45] July 22, 1975

[54] METHOD OF INHIBITING ALGAE EMPLOYING NITROGEN DERIVATIVES OF HALOGENATED BIPHENYLS

[75] Inventors: John J. Merianos, Jersey City, N.J.; Edward Griffin Shay, Suffern, N.Y.; Phillip Adams, Murray Hill; Alfonso N. Petrocci, Glen Rock, both of N.J.

[73] Assignee: Millmaster Onyx Corporation, New York, N.Y.

[22] Filed: Apr. 9, 1973

[21] Appl. No.: 349,630

Related U.S. Application Data

[63] Continuation-in-part of Ser. No. 38,513, May 18, 1970, Pat. No. 3,733,421, which is a continuation-in-part of Ser. No. 883,636, Dec. 9, 1969, Pat. No. 3,663,620.

[52] U.S. Cl. .................................................... 71/67

[51] Int. Cl.$^2$ ............................................ A01N 9/20

[58] Field of Search ........................................ 71/67

[56] References Cited

UNITED STATES PATENTS 3,394,137 3/1974 Morris .................................. 71/67

OTHER PUBLICATIONS

Szobel et al., Chem. Abst., Vol. 59, 1963.

*Primary Examiner*—Lewis Gotts
*Assistant Examiner*—Catherine L. Mills
*Attorney, Agent, or Firm*—Arthur A. Jacobs

[57] ABSTRACT

Microbiocidal bis-amino substituted halogenated biphenyls, especially adapted for use as algaecides.

3 Claims, No Drawings

METHOD OF INHIBITING ALGAE EMPLOYING NITROGEN DERIVATIVES OF HALOGENATED BIPHENYLS

This is a continuation-in-part of application Ser. No. 38,513 filed May 18, 1970, now issued as U.S. Pat. No. 3,733,421 dated May 15, 1973 said application being itself a continuation-in-part of application Ser. No. 883,636, filed Dec. 9, 1969 and issued as U.S. Pat. No. 3,663,620 on May 16, 1972.

This invention relates to bis-amino derivatives of halogenated biphenyls, and mixtures thereof, which have marked antimicrobial efficacy; and it particularly relates to the use of these compounds as algaecides.

The compounds employed in the invention comprise the bis-aminosubstituted halogenated biphenyls having the general structure:

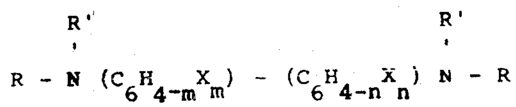

in which $m$ and $n$ are integers from 0 to 4, X is a halogen, R and R' are either hydrogen, alkyl or hydroxyalky, or form the residue of an amine or polyamine, or part of a cyclic amine structure, R and R' may be either the same or different from each other and may be part of a polyamine; and there is at least one halogen atom; and with or without a content of unreacted halobiphenyl. In every case X may be fluorine, chlorine, bromine or iodine.

It was heretofore believed that only the monoamino-substituted compounds of this type were satisfactory to obtain the desired microbiocidal results. However, it has now been found that the bis compounds, by themselves, or in certain admixtures with each other, are very effective for such purposes.

In addition to their own inherent microbiocidal activity, these amino compounds can be used as intermediates for the preparation of a variety of other nitrogen compounds having antimicrobial powers. Among such are quaternary ammonium compounds, tertiary amine oxides, imidazolines, ampholytes, Schiff's bases, amides, metal-amino coordination compounds, and, in general, antimicrobial derivatives of the amino group or groups to which the polyhalobiphenyl portion additionally contributes its own characteristics, such as, for example, a high degree of fire retardancy.

The bis compounds are prepared by reacting either ammonia or an amine with a halobiphenyl in such a manner that the mol ratio of ammonia or amine to halo biphenyl is at least 5:1 and preferably at least 10:1. On the other hand, when the mol ratio is less than 5:1, more of the monoamino compound is obtained. The monoamine compounds have the structure:

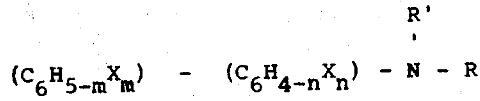

wherein $m$ is an integer from 0 to 5, $n$ is an integer from 0 to 4, X is a halogen, and there is at least one halogen atom, R and R' being either selected from the group consisting of hydrogen, alkyl, and hydroxyalkyl, or the residue of an amine or a polyamine, or are part of a cyclic amine structure; and wherein R and R' may be either the same or different, and may be part of a polyamine.

Where chlorinated compounds are disclosed in the examples, the fluorinated, brominated, or iodinated compounds may be substituted in each case for the chlorinated compounds.

As a source of raw materials, the "Aroclors" (polychlorinated polyphenyls — Monsanto) provided a wide range of polychlorinated biphenyls, e.g. "Aroclor 1260" (said to contain 60% of chlorine) and "Aroclor 1268" (said to contain 68% of chlorine). Others with other chlorine content, especially "Aroclors" 1232, 1242, 1248, 1254, and 1262, having chlorine contents of about the percent by weight represented by the last two digits in each case, have also been satisfactorily reacted, but the reaction rates of the members containing lesser amounts of chlorine are lower. In the case of these members, the addition of catalytic amounts of cuprous chloride or ferric chloride accelerate the reaction.

The halobiphenylamino compounds of the present invention may be employed either as the free amines or as their salts of inorganic or organic acids in order to improve their compatibility with aqueous, oily or solvent systems or to satisfy pH requirements. Such acids may include, for example, hydrochloric, sulfuric, phosphoric, acetic, lauric, oleic, gluconic, oxalic, tartaric, citric, benzoic and substituted benzoic, paratoluene sulfonic, sulfamic, and the like.

The following examples are illustrative of the invention.

EXAMPLE 1

A 1 liter, three-necked round bottom flask, fitted with an agitator, a thermometer and a reflux condenser, was charged with 326 grams (or 1 mol) of "Aroclor 1254" and 1,030 grams (or 10 mols) of diethylene triamine were charged. The mixture was heated under agitation at the reflux temperature, about 205°C, at atmospheric pressure for about 40 hours. The resulting product was bis-(diethylenetriamino)-trichlorobiphenyl.

A snatch sample was titrated argentometrically and was found to contain 5.5% of ionic chlorine. Theory for this product is 5.25%.

The excess diethylene triamine was distilled off under 10–20 mm. pressure; the cooled residue was drowned in water containing caustic soda. The product layer was separated, washed and dried by heating at 100°–120°C at 10–20 mm. pressure to a brown paste. Titration with acid indicated an equivalent weight of 126, the theoretical being 115.

EXAMPLE 2

In a similar manner to Example 1, the bis-aminosubstituted derivatives of diethylene triamine with "Aroclors" 1242, 1248, 1260, 1262 and 1268 were prepared.

EXAMPLE 3

Using the same procedure as in Examples 1 and 2, and using the corresponding "Aroclor" for each specific product, the following compounds were prepared:

Bis-(Ethylenediamino) Trichlorobiphenyl
Bis-(Propylenediamino) Trichlorobiphenyl
Bis-(3-Dimethylaminopropylamino) Trichlorobiphenyl Bis-(Triethylenetetramino) Trichlorobiphenyl
Bis-(Isophoronediamino) Trichlorobiphenyl
Bis-(Hexamethylenediamino) Trichlorobiphenyl
Bis-(Diethylenetriamino) Octachlorobiphenyl
Bis-(Isophoromediamino) Tetrachlorobiphenyl
Bis-(Isophoronediamino) Octachlorobiphenyl
Bis-(Ethylenediamino) Tetrachlorobiphenyl

EXAMPLE 4

Metal-amino coordination products were prepared by methods exemplified by the following procedure:

13.6 grams (or 0.1 mol) of anhydrous zinc chloride and 300 ml. of dry toluene were charged into a round-bottomed flask fitted with an agitator, a thermometer, a reflux condenser and a dropping funnel. The mixture was heated at 40°C while gradually adding a mixture of 157 grams (or 0.3 mol) of N-(nonachlorobiphenyl) ethylenediamine and 600 ml. of toluene. When the addition was complete, the mixture was heated for about two hours at the reflux temperature at atmospheric pressure.

After cooling to room temperature, the suspension was filtered off, to yield tris-[N-(nonachlorobiphenyl) ethylene diamine]$ZnCl_2$.

This product was particularly effective in the preservation of paint films against fungal attack.

EXAMPLE 5

The related compounds were prepared by subsituting for zinc chloride other salts such as $BCl_3$, $CuCl_2$, $AlCl_3$, $MnCl_2$, $MgCl_2$, $CoCl_2$, and the like, the amount of each varying with the molecular weight.

EXAMPLE 6

The polybromobiphenyls may be prepared by brominating biphenyl in the presence of catalysts such as iodine, iron or aluminum, and along with agents such as sulfuric acid or chlorine, by methods known to the art, such as are described, for example, in British Pat. specification No. 934,970, and German Pat. Nos. 1,136,683 and 1,161,547.

The bromobiphenyls react with the amines and with ammonia in the same way as the chlorobiphenyls.

EXAMPLE 7

The "Aroclors" may be converted to fluorinated biphenyls, with or without one or more residue halogen atoms, by fluoroination followed by dehydrohalogenation, by which process fluorine addition products of the chlorobiphenyls are formed, which are then rendered aromatic again by the reaction of caustic alkali, removing hydrogen and chlorine. This procedure is described in V. Grakauskas' "Direct Liquid Phase Fluorination of Halogenated Aromatic Compounds," in the Journal of Organic Chemistry, Vol. 34, No. 10, pp. 2835–39 (October, 1969).

The polyfluorobiphenyls react with amino compounds in the same way as the "Aroclors," to yield the corresponding fluoroderivatives.

EXAMPLE 8

The polyiodinated biphenyls are also prepared by methods known to the art, for example, by reaction of "Aroclors" with KI.

These, too, react with amino compounds to yield the corresponding iodobiphenyl derivatives.

EXAMPLE 9

For antimicrobiocidal evaluation of certain of the above compounds, the Standard Broth Inhibition test method was employed. Aliquots of the test materials were added to appropriate broth culture media contained in test tubes so that various concentrations of the test material in culture media were obtained. The tubes so prepared were inoculated with 7-day broth cultures of the algae. The inoculated tubes were incubated for 7 days at 25°C. Following the aforementioned incubation period, the tubes were examined for the presence or absence of macroscopic growth. The lowest concentration of test material in the broth which does not permit macroscopic growth is designated as the "Minimum Inhibitory Level."

The organism employed in the tests was chlorella pyrenoidosa WIS 2005.

To 9.0 ml. of a suitable medium, 1.0 ml. of a solution of each compound was added, and the mixture was inoculated with the test organism. The final concentrations were 300,000 cells per ml. for the algae, and 1,000, 100, 10 and 1 ppm. for the compound being tested. After incubation, for 7 days at 28°C, the cells were counted by the plate-count method.

The results were tabulated as follows:

| Compound | Static Level in PPM |
|---|---|
| Bis-(Ethylenediamino) Trichlorobiphenyl | 1 |
| Bis-(Propylenediamino) Trichlorobiphenyl | 1 |
| Bis-(3-Dimethylaminopropylamino) Trichlorobiphenyl | 50 |
| Bis-(Triethylenetetramino) Trichlorophenyl | 50 |
| Bis-(Isophoronediamino) Trichlorobiphenyl | 50 |
| Bis-(Hexamethylenediamino) Trichlorobiphenyl | 50 |
| Bis-(Diethylenetriamino) Octachlorobiphenyl | 1 |
| Bis-(Isophoronediamino) Tetrachlorobiphenyl | 50 |
| Bis-(Isophoronediamino) Octachlorobiphenyl | 50 |
| Bis-(Ethylenediamino) Tetrachlorobiphenyl | 1 |

The invention claimed is:

1. A method of inhibiting algae which comprises applying to the algae an algaecidally effective amount of at least one di-substituted polyhalobiphenyl selected from the group consisting of:

Bis-(Ethylenediamino) Trichlorobiphenyl
Bis-(Propylenediamino) Trichlorobiphenyl
Bis-(3-Dimethylaminopropylamino) Trichlorobiphenyl
Bis-(Triethylenetetramino) Trichlorobiphenyl
Bis-(Isophoronediamino) Trichlorobiphenyl
Bis-(Hexamethylenediamino) Trichlorobiphenyl
Bis-(Diethylenetriamino) Octachlorobiphenyl
Bis-(Isophoronediamino) Tetrachlorobiphenyl
Bis-(Isophoromediamino) Octachlorobiphenyl
Bis-(Ethylenediamino) Tetrachlorobiphenyl

2. The method of claim 1 wherein the algae are in water.

3. The method of claim 1 wherein the algae are in surface-active agents.

* * * * *